(12) United States Patent
Faulkner

(10) Patent No.: US 9,359,139 B1
(45) Date of Patent: Jun. 7, 2016

(54) CHUTE SYSTEM

(71) Applicant: Edward R. Faulkner, Medford, NY (US)

(72) Inventor: Edward R. Faulkner, Medford, NY (US)

( * ) Notice: Subject to any disclaimer, the term of this patent is extended or adjusted under 35 U.S.C. 154(b) by 0 days.

(21) Appl. No.: 14/732,091

(22) Filed: Jun. 5, 2015

(51) Int. Cl.
*B65G 11/00* (2006.01)
*B65G 11/02* (2006.01)

(52) U.S. Cl.
CPC .................................. *B65G 11/023* (2013.01)

(58) Field of Classification Search
CPC ....... B65G 11/00; B65G 11/12; B65G 11/126
USPC ......................................... 193/6, 15, 17, 2 A
See application file for complete search history.

(56) References Cited

U.S. PATENT DOCUMENTS

| 882,605 A * | 3/1908 | Young | E04F 17/12 193/17 |
|---|---|---|---|
| 1,926,207 A | 9/1933 | MacAlpine | |
| 3,157,262 A | 11/1964 | Chapdelaine | |
| 3,695,356 A * | 10/1972 | Argabright | C09K 8/5086 166/294 |
| 4,260,313 A * | 4/1981 | Van Dusen | B65D 90/54 193/34 |
| 4,712,664 A * | 12/1987 | Angus | B65G 11/186 182/48 |
| 5,035,313 A | 7/1991 | Smith | |
| 5,127,507 A * | 7/1992 | McDermott | E04F 17/12 193/17 |
| 5,515,941 A | 5/1996 | Palmer | |
| 7,581,629 B2 | 9/2009 | Kohler | |

FOREIGN PATENT DOCUMENTS

| DE | 2919781 A1 | 11/1980 |
|---|---|---|
| EP | 0201847 A2 | 5/1986 |
| EP | 0212909 A2 | 3/1987 |
| GB | 2185735 A | 7/1987 |

\* cited by examiner

*Primary Examiner* — James R Bidwell
(74) *Attorney, Agent, or Firm* — Notaro, Michalos & Zaccaria P.C.

(57) ABSTRACT

A chute system includes a pair of support rails, each having a bent reinforcement member secured to it. The chute is made up of multiple chute panels, which nest within one another for ease of storage and transportation. A spacer bar sets the system width and provides overall support. The system also includes a pair of hinged anchors for adjustably securing the system to the edge of a roof. There is also a roof eave debris stop for preventing debris from sliding off the roof onto landscaping, humans and animals below.

14 Claims, 17 Drawing Sheets

CHUTE SYSTEM

FIELD AND BACKGROUND OF THE INVENTION

The present invention relates generally to the field of facilitating removal of roof materials and in particular to a new and useful chute system for safely and efficiently delivering materials and debris from roof structures.

A typical roof shingle weighs approximately 3 lbs. per square ft. A normal roof replacement consists of removing two layers of asphalt shingles. The typical roof area of an average single family dwelling is about 2300' sq. feet of roof area. The weight of the roofing being removed is about 13,800 lbs, and, half that weight comes off the front of the dwelling and the other half off the rear. That represents about 7000 lbs of roofing materials being pushed of the roof edge on either a one- or two-story dwelling, potentially free falling and landing on the area below. The landing area typically consists of walkways, driveways, expensive landscaping, finished siding, finished decks, fencing, windows, doorways, and human and pet traffic into and out of the dwelling.

Depending on the roof size there may be several workers engaged in this roof ripping process. As the shingles are detached, the loose shingles are pushed down slope towards the roof edge. If the slope is steep, the shingles tend to slide on their own down to the roof edge. Some contractors, at best, place a light-weight tarp on the roof edge and drape it down to the ground. The tarp is hung at an extreme vertical direction to cover the façade of the dwelling and the surroundings directly below. Such tarps have no structural integrity, and rip quite readily. They offer very limited protection when the heavy items, such as asphalt shingles free-fall to the area below. These tarps also create blind spots for both the homeowner walking out from the dwelling and the workers. Even those workers on the ground level cannot see people are coming out of the dwelling. These conditions worsen when the work is performed on multi-family dwellings (e.g., condominiums, co-ops, or apartments) and commercial properties.

UK Patent Application GB2185735 by Pateman discloses a chute for use in conveying tiles from a roof. It includes multiple elongate flat-bottomed chute members each adapted to be supported between the stiles of a ladder, with an end of a chute member being received within an end of an adjacent chute member. Each chute member is attached to the ladder by a hook engaging a ladder rung.

However this chute was designed to rest on a standard industry single rung ladder to support the chute. This design requires a ladder and constrains the chute width to the width of the ladder. The width of a standard industry Werner aluminum ladder, for example, is only available at a maximum width of 20⅝" (off the side rails). The ladder side rails are typically 1⅜" wide. This only gives an overall inside width of 18". This limits a chute to an 18" width on the flat base of the chute. It limits the overall length of a chute system to 24'. As well, the ladder support is limited to its sloping ability. A ladder is only designed to be placed a short distance off the vertical wall of the building, which creates an extreme vertical downward slope. This limits the placement of a chute in relationship to the building surroundings. Thus, the invention disclosed by Pateman is limited to positioning the chute into a waste container or dump truck, as there are also many variable surrounding conditions next to a building structure: trees, shrubs, expensive landscape beds, walkways, decks, mechanical equipment, windows, doors, people and pets. Debris will travel rapidly down the chute causing unsafe conditions to workers, and possible damage to surroundings.

As well, the ladder support lacks a means to safely secure the ladder to the building at the roof elevation.

The Pateman chute width of 18" is inferior to adequately transport the removal of asphalt roof shingles during the rip phase of a re-roofing project. It also limits the removal of general construction material and debris from an elevated building structure.

The placement of the chutes as taught by Pateman offered limited placement adjustment, and creates difficulty in the initial erecting and placement of the chutes onto the ladder. To attach the upper chute while the ladder is place against the building structure presents many issues regarding safety and compliance with OSHA standards.

US Patent Application US 2008/0230346 by Kohler teaches a construction debris chute system which includes a construction debris chute formed by multiple common panels with the multiple common panels each including a first panel, a second panel and a bottom panel that are linked to each other by a set of hinged anchors. It also includes a construction debris receiver box including a frame box and a chute-receiving portion extending at an angle from the frame box. The bottom discharge unit includes a discharge platform frame fitted to extend over a portion of a dumpster and a chute-supporting base extending upwards at an angle from the discharge platform frame for receiving a second end of the construction debris chute.

Among other problems, the Kohler chute requires a column support near the bottom. It is desirable to provide a chute system which does not require any mid-span pole/column supports under the chutes regardless the slope placement.

The present invention is directed to solving these and other problems in the field of removing asphalt roofing shingles from residential and commercial sloped roof structures.

SUMMARY OF THE INVENTION

It is an object of the present invention to provide a system for making the demolition process more efficient by providing an effective and convenient system for sending the debris directly into a debris dumpster or dump truck.

It is also an object of the invention to provide a device which will save many labor hours by avoiding the one-at-a-time handling of debris.

It is a further object to provide a versatile construction chute system that can be used to remove roofing debris, roof or stadium snow, and general construction debris.

These and other objects are achieved by a chute system includes a pair of support rails, each having bent reinforcement members secured along their sides. The chute is made up of multiple chute panels, which nest within one another for ease of storage and transportation. A spacer bar, which may be positioned at multiple locations, sets the system width and provides overall support. The system also includes a pair of hinged anchors for adjustably securing the system to the edge of a roof. There is also provided a roof eave debris stop for preventing debris from sliding off the roof onto landscaping, humans and animals below.

The bent chute panels of the present system are made to nest into one another for ease of assembly and shipment. The chute panels lock into place along the rails during assembly. There is also provided a T-shaped chute engaging pole to set the position of the chute panels.

Typical embodiments of the system are 24' in length. However, it is within the scope of the invention for the system to be of any convenient length, such as, for example, 40'. These are exemplary lengths, provided for illustration. It is within the scope of the invention for the system to extend any length to address the needs of a particular project.

The tops of the side rails which support the chutes of the system are attached to the structure with steel hinged anchors, which allow the chute to proceed at a downward angle to bear on a debris dumpster or directly into a truck.

This system is meant to make the demolition process more efficient by providing for the delivery of the debris directly into a dumpster or truck. Thus, the materials are only handled once. The present system is designed so that the time needed for assembly and break-down will be far less than the labor hours needed to handle the debris a second time. That is, handling the debris that, absent the present invention, was not delivered directly into the dumpster or truck.

The present versatile chute system can be used for various purposes, including, but not limited to 1) removal of asphalt roofing shingles safely from slope roof structures on both residential and commercial structures; 2) removing debris from interior renovations; 3) hoisting equipment; 4) moving materials up to and down from the work areas; and 5) snow removal from roof structures and stadium seating isles.

The present invention, includes, as well, roof edge debris stops which prevent debris from falling below, creating a safer work space for both workers and property owners. The present debris stops also help reduce the possibility of damage to the landscaping, building façade, and overall surroundings. All debris is transported safely down the chute.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
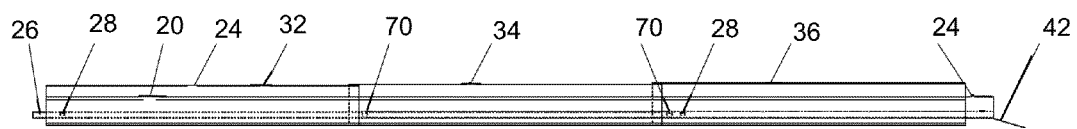
FIG. 1 is a side elevational view of the present chute system.

Referring now to the drawings, FIGS. 1, 2, 6 and 7 show an overview of the present chute system 10.

The system 10 includes a pair of support rails 20 and associated components, namely a bent reinforcement elements 24 (for providing additional load-bearing support), spacer bar 28, and adjustable hinged anchors 42. It is preferred that the support rail 20, the spacer bar 28, and the adjustable hinged anchors 42 be made of steel. It is also preferred that the bent reinforcement element 24 be made of aluminum. However, these components may be made of any convenient material effective for achieving the objectives of the invention discussed herein.

Figure 5:
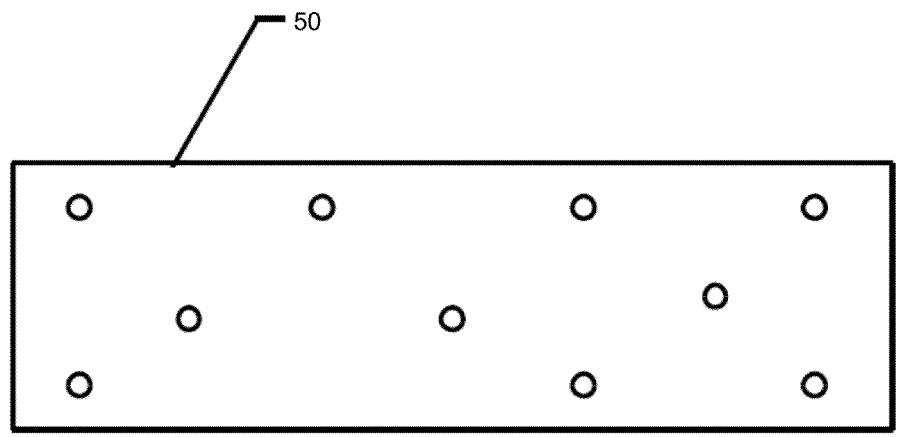
FIG. 5 is a top plan view of the support rail extender gusset plate.
Figure 6:
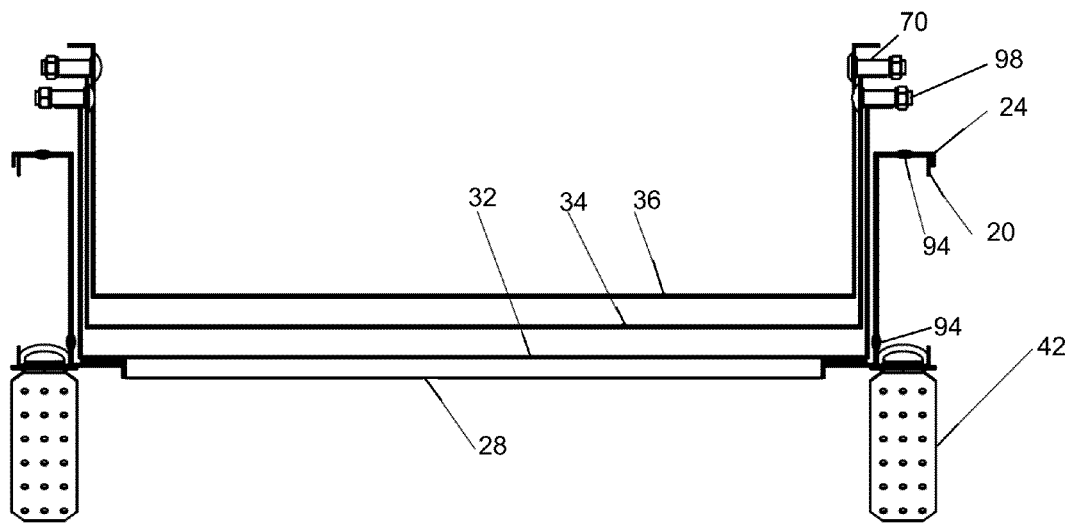
FIG. 6 is a rear elevational view of the present chute system.
Figure 7:
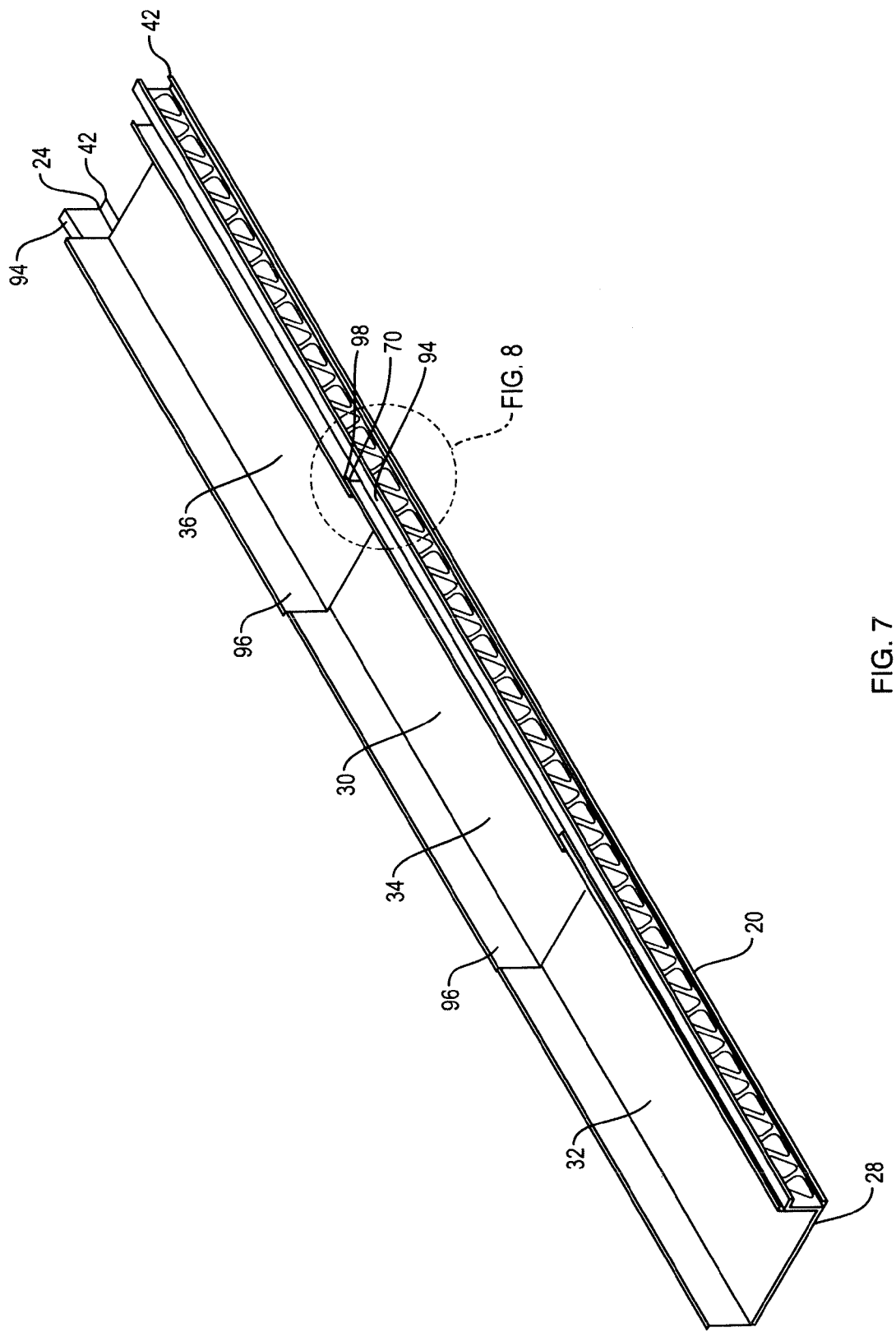
FIG. 7 is a top perspective view of the present chute system.

In typical embodiments, there two support rails 20 used to support the chute on each side. In certain embodiments, the support rails 20 are 16' long. In other embodiments, the support rails 20 are 24' long. In certain embodiments of the system 10, support rails 20 may be connected with a support rail extender gusset plate 50 (FIG. 5), to produce a 40' support rail 20. As detailed below, the length of the support rails 20 is a function of the length of the chute 30 employed. The support rails 20 may be any length convenient for achieving the objectives of the invention discussed herein.

Figure 16:
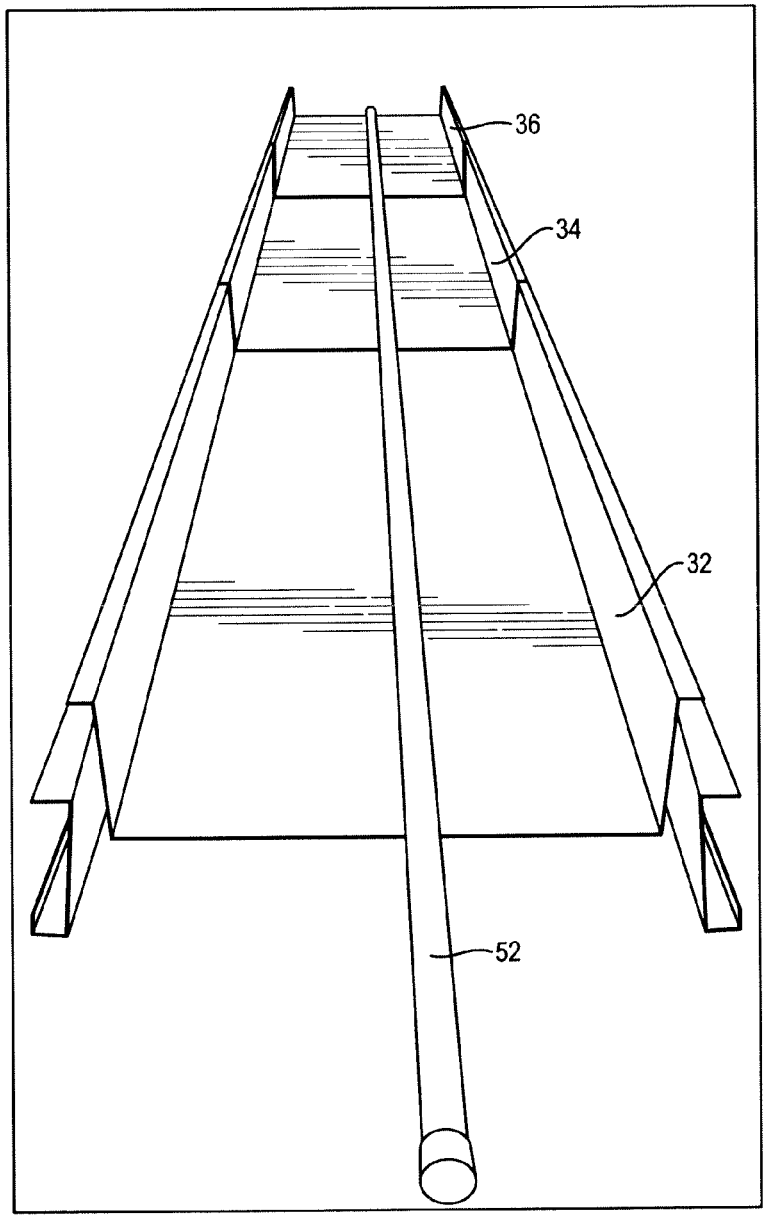
FIG. 16 is a top perspective view of the chute system, showing the T-shaped chute engaging pole thereof.
Figure 17:
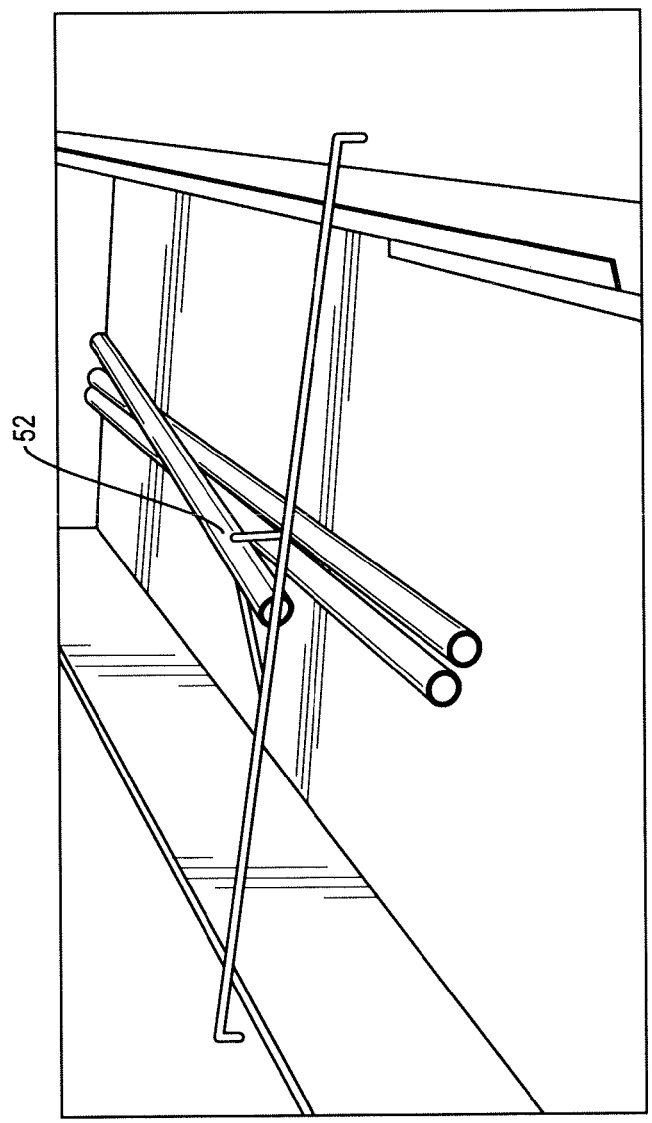
FIG. 17 is a further, closer top perspective view of the T-shaped chute engaging pole.

A pair of 16' support rails 20 will accommodate up to two 8' chute panels 32, 34. A 16', i.e., a two panel 32, 34 embodiment of the system 10 is appropriate for servicing a one- or two-story dwelling. A pair of 24' support rails 20 will accommodate up to three 8' chute panels 32, 34, and 36. The extended 40' support rails 20 may accommodate five 8' chute panels 32, 34, 36, 38, and 40. This extended length is adapted to service a typical three story residence. It may also service a commercial building having a height of 30'. These lengths are exemplary and any necessary length may be achieved within the scope of the invention. There is also provided a T-shaped chute engaging pole 52, shown in FIGS. 16 and 17, to set the position of the chute panels. As best shown in FIG. 17, the T-shaped chute engaging pole 52 is collapsible for ease of storage and transportation. The T-shaped engaging pole 52 may be stored on the side rail 20 or on the spacer bar 28 during transportation.

Typically, an individual support rail 20 employed is no heavier than a standard industry aluminum or fiberglass extension ladder. This allows one person to handle the support rail without difficulty.

In typical embodiments, the two support rails 20 are two galvanized steel joist members, such as the JOISTRITE members, described in U.S. Pat. No. 7,765,771, which is incorporated herein by reference in its entirety.

Figure 8:
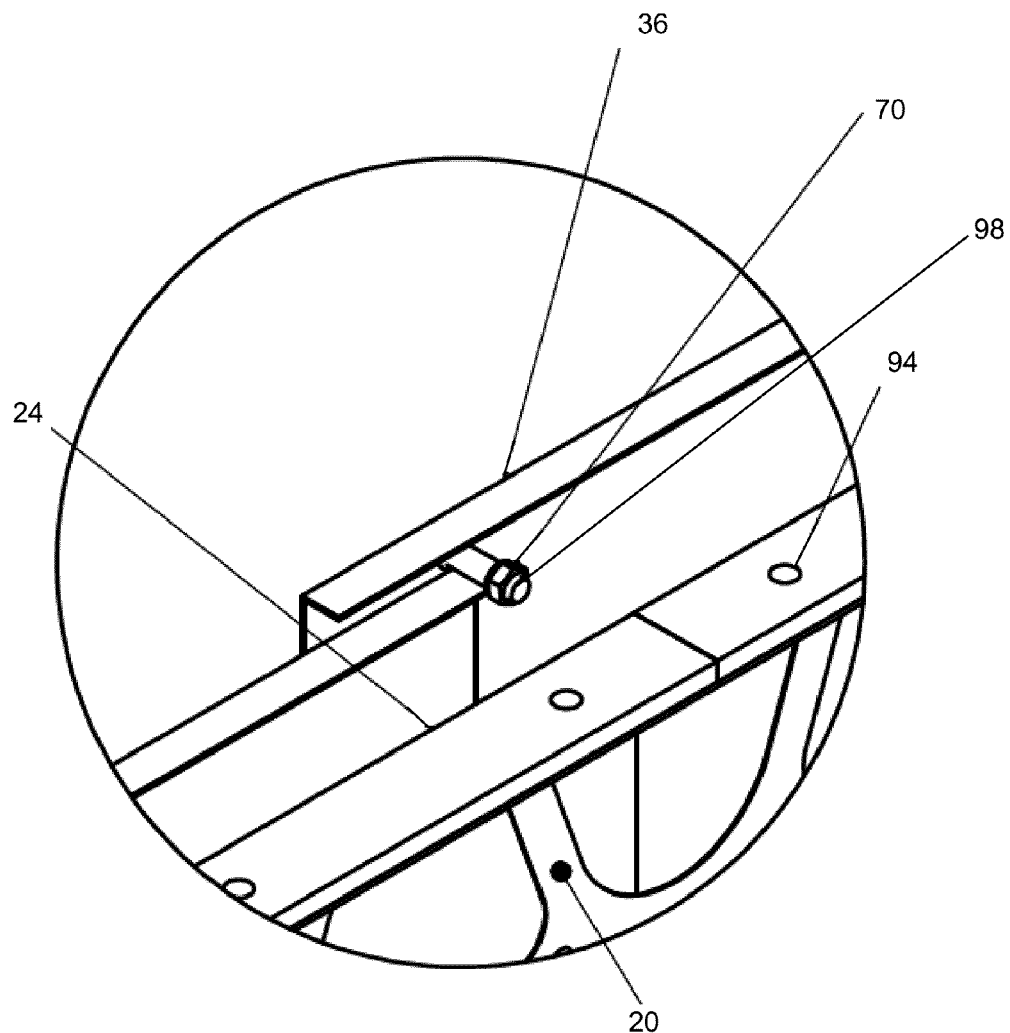
FIG. 8 is an enlarged view of detail area 8-8 shown in FIG. 7.
Figure 10:
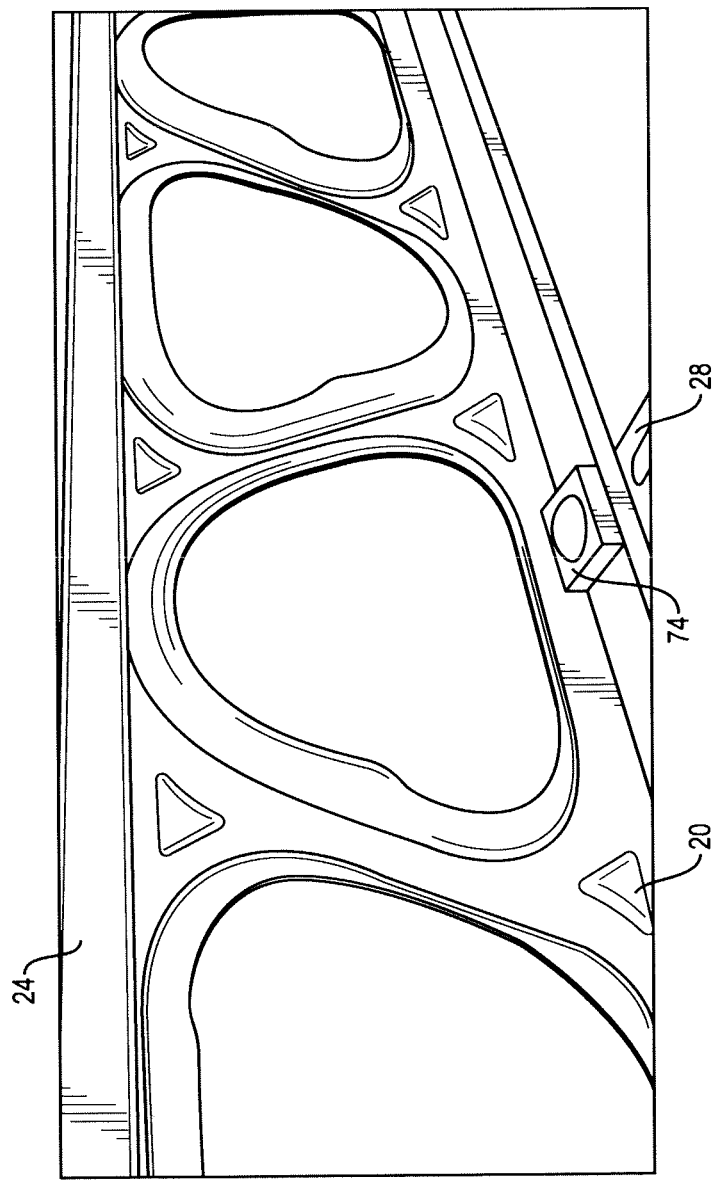
FIG. 10 is a close-up, side perspective view of a support rail.
Figure 15:
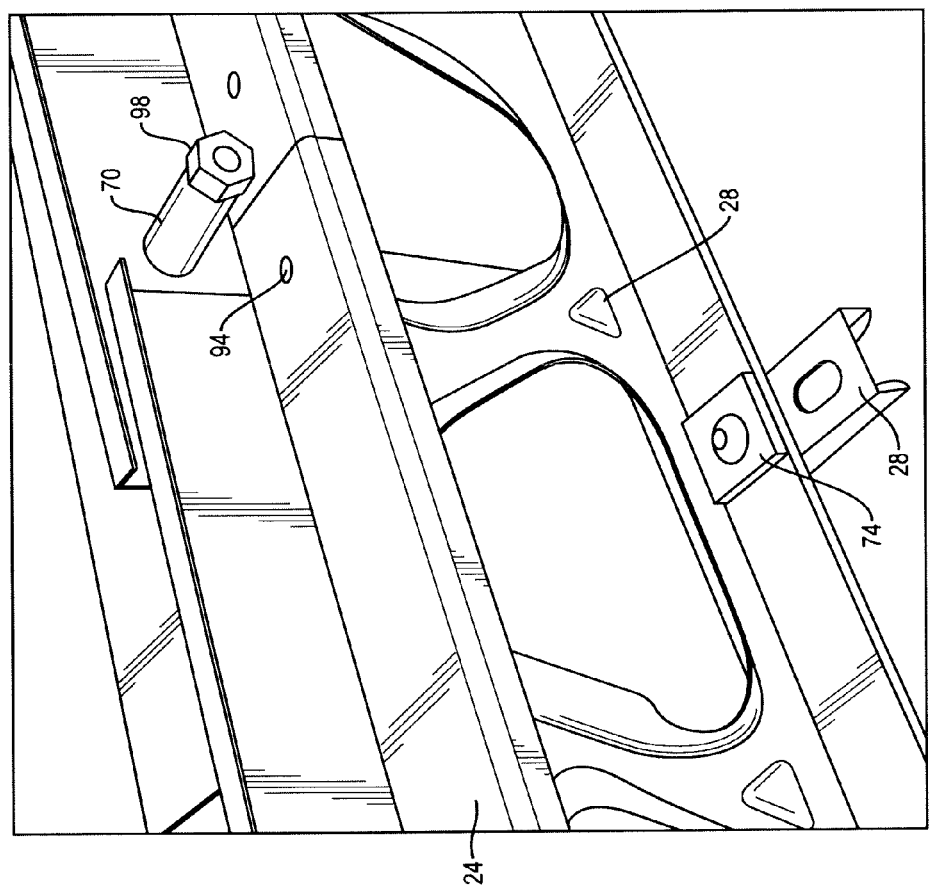
FIG. 15 is close-up, top, side perspective view of a support rail.

In preferred embodiments, attached to the rails are "Z" bent reinforcement elements 24 (FIGS. 8, 10, 15). The "Z" bent reinforcement elements 24 are typically 0.080" wide and 8' long, but may of any dimension necessary to achieve the objectives of the invention. As best shown in FIGS. 8 and 15, the "Z" bent reinforcement elements 24 are attached to the rails using any convenient and effective fastening means such as, for example, one or more pop rivets 94.

The side rails 20 are spaced according to the chute 30 width. The support rails 20 are connected to each other by a spacer bar 28. The spacer bar 28 is employed to set the precise span for chute 30 placement on the side rails 20. It also stabilizes the cooperating side rails 20, and stabilizes the system 10, generally. The spacer bar 28 is received into the rails 20 and affixed thereto. There are multiple locations on the rails 20 to which the spacer bar 28 may be affixed by, for example, a spacer bar connection 74 (FIGS. 10 and 15). The spacer bar 28 may be stored on the rails 20 during transport. The spacer bar 28 is commercially available as a KINDORF B-907HS bar from Thomas & Betts.

Figure 2:
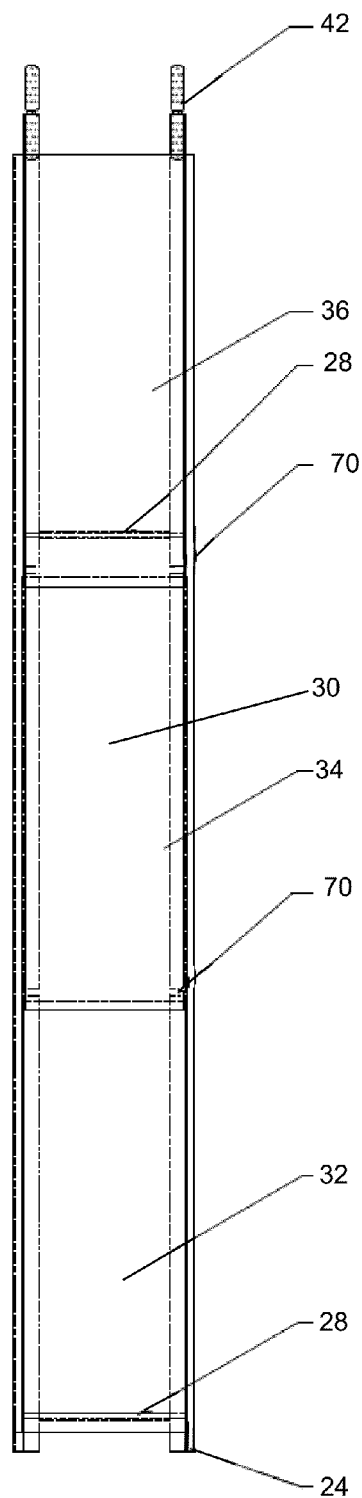
FIG. 2 is a top plan view thereof.

Attached to the top of each support rail 20 is an adjustable hinged anchor 42, as shown in FIG. 2. Thus, the support rail 20, the bent reinforcement elements 24, and the spacer bar 28 all cooperate to support the chute 30 in position.

Figure 3:
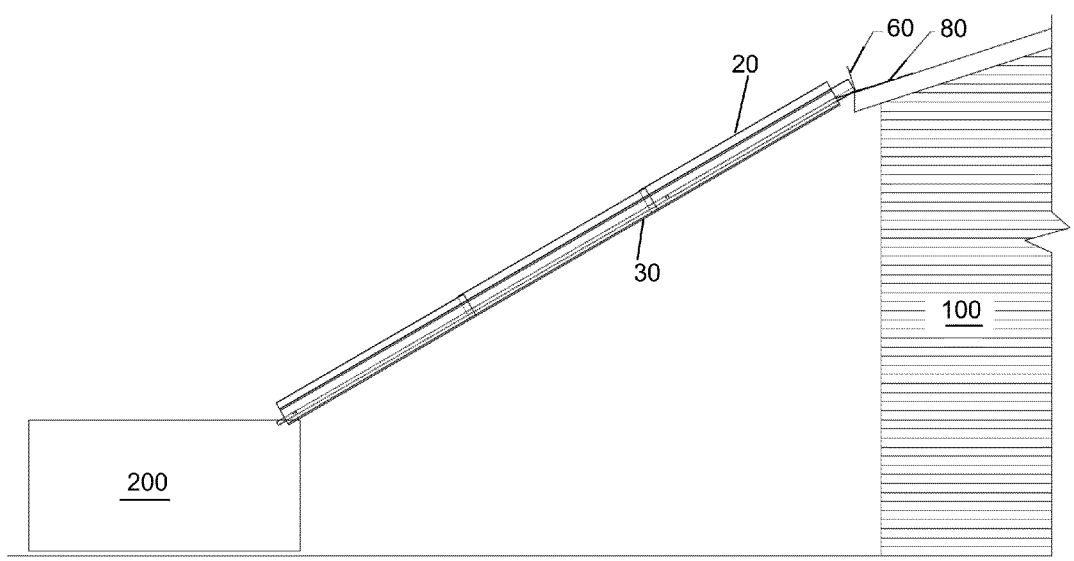
FIG. 3 is a side elevational view showing the present chute system positioned against the roof of a house at one end and dumpster on another end.
Figure 4:
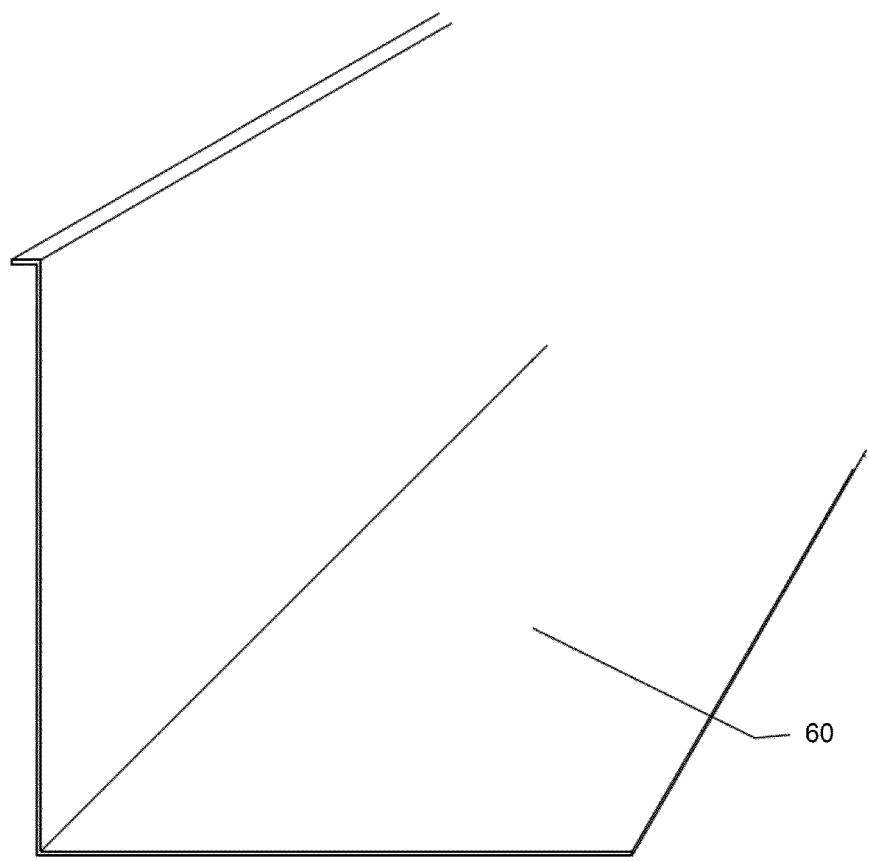
FIG. 4 is a perspective view of the bent roof eave debris stop.

The bases of the support rails 20 are designed in a way that the system 10 can rest on a dump truck, stationary dumpster, or be placed directly on the ground. This unique design affords the present chute system 10 adaptability to all possible usage applications. For example, FIG. 3 shows that the system 10 is easily adapted to rest between a typical residential structure 100 and a dumpster 200.

Once the support rails 20 are firmly secured the building structure, the panels 32, 34, 36 can be easily set into place.

The support rails 20 are designed to connect to the top edge of any slope or flat roof structure (i.e., the eave), by employing an adjustable heavy gauge steel hinged anchor part, referred to as an adjustable hinged anchor 42 herein. This adjustable hinged anchor 42, shown in FIGS. 1, 2, 6, 7, 9, and 11-13, may be permanently attached to the support rail 20. These allow the support rail 20 to be fastened to almost any type roof structure without modification in the field by workers. The wide range of angles offered by the adjustable hinged anchor 42 makes it adaptable to any angle transition from any roof slope or window opening. The adjustable hinged anchor 42 is commercially available under the brand name GUARDIAN from GF Protection Inc. (Part #00455). One adjustable hinged anchor 42 is attached to each side support rail 20, attached permanently to the top reinforcement element 24 by any convenient fastening means such as, for example, by a pop rivet 94 (e.g., ³⁄₁₆" Aluminum pop rivets).

Figure 9:
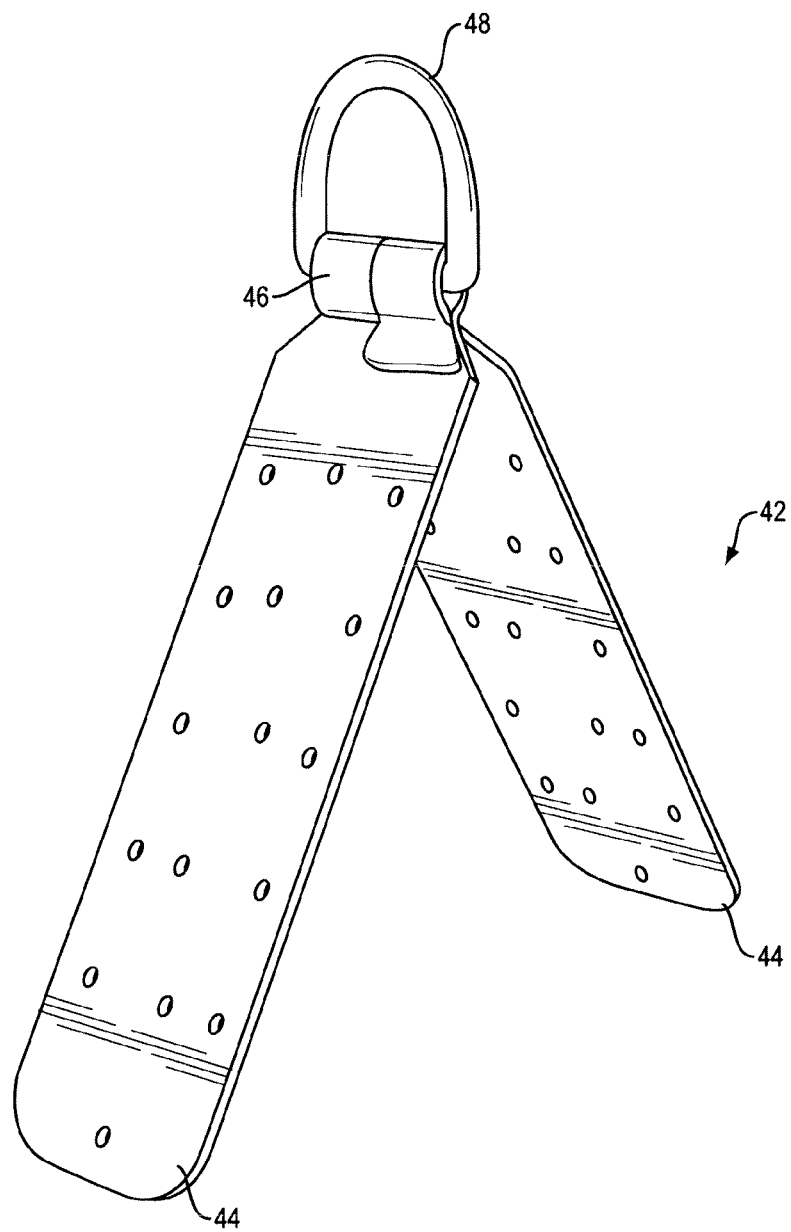
FIG. 9 is a perspective view of the adjustable hinged anchor.
Figure 11:
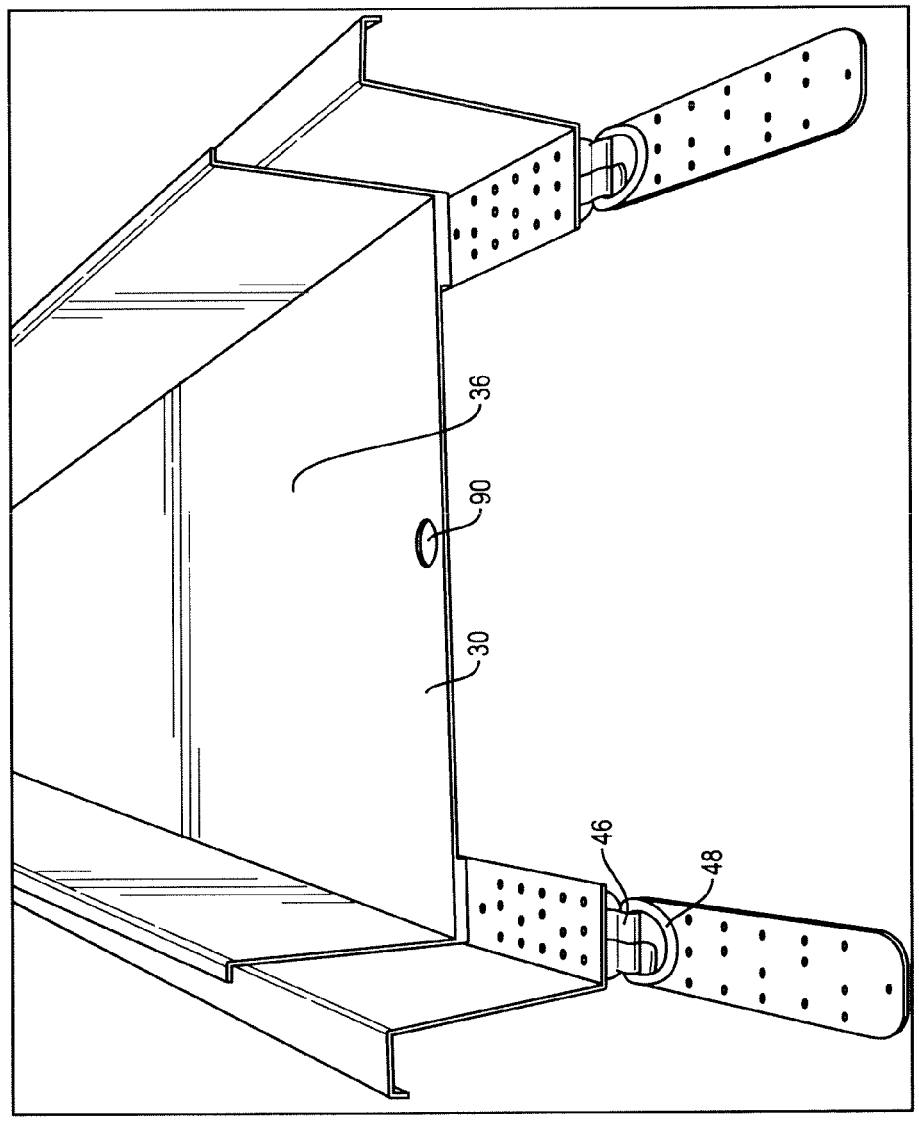
FIG. 11 is a close-up, rear perspective view of the present system, showing adjustable hinged anchors in place.
Figure 12:
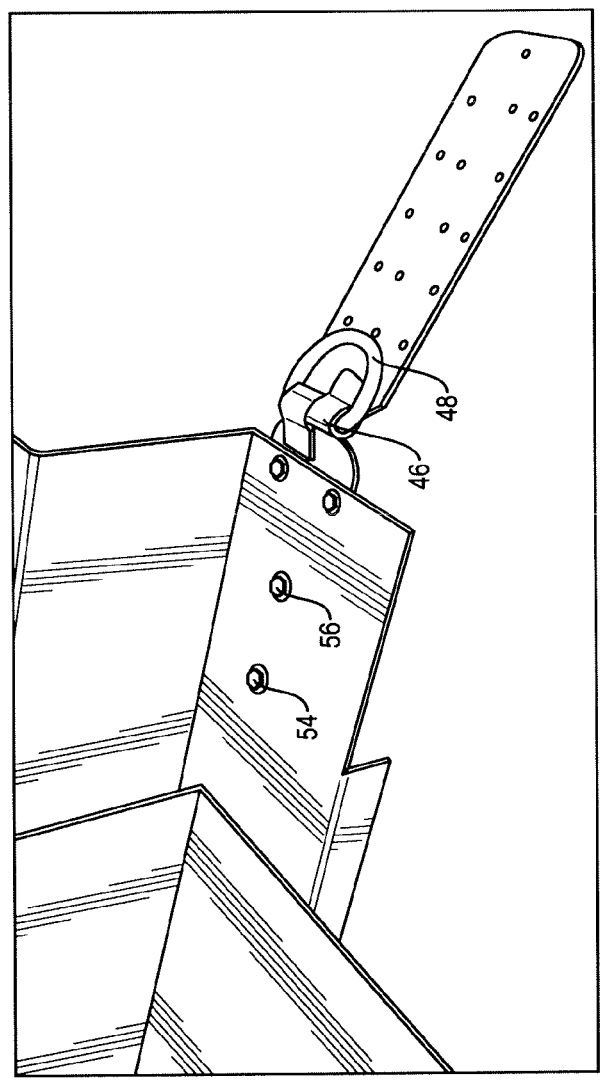
FIG. 12 is a top perspective view of an adjustable hinged anchor in place, showing the anchor secured by stainless steel bolts and associated components.
Figure 13:
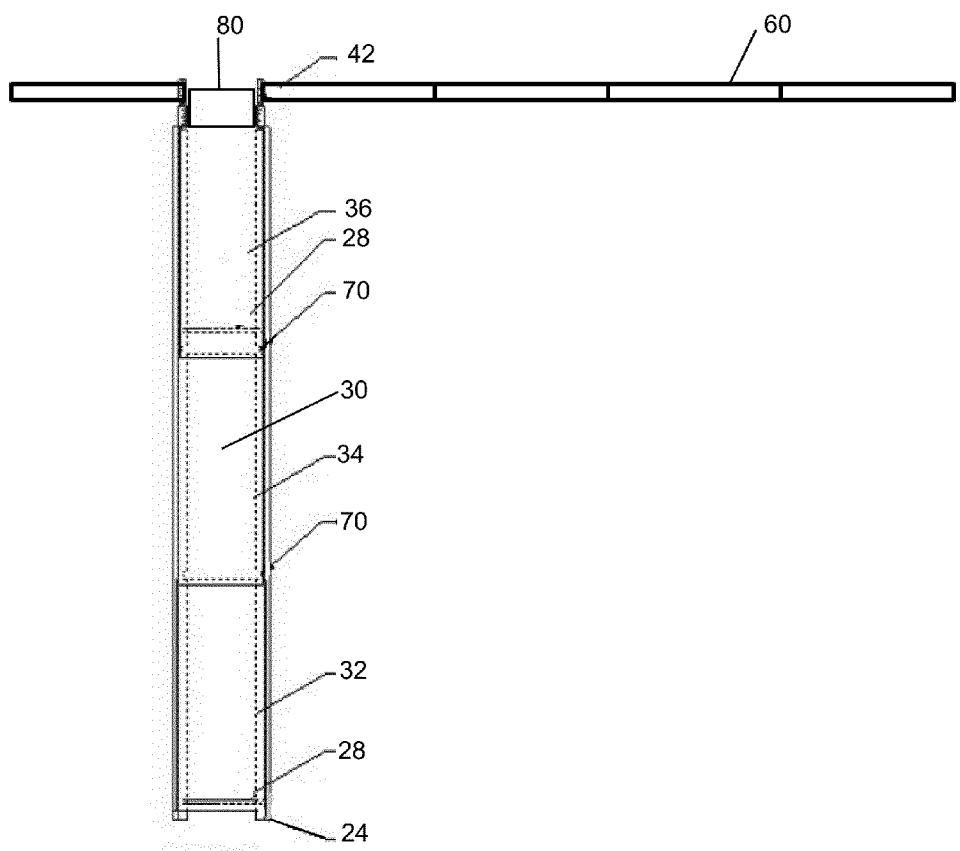
FIG. 13 is a top plan view of the system, showing three chute panels, the support rails and the bent roof eave debris stop.

As shown in FIGS. 9, 11, and 12, the adjustable hinged anchor 42 has two flaps 44 which are connected at a hinge 46. The hinge 46 is formed by passing a D-ring 48 through respective openings at facing ends of the flaps 44. With the adjustable hinged anchors 42 attached to the support rails 20, the D-rings 48 serve as points for securing and hoisting the respective side rails 20 to position the system 10 at a desired location on a roof. As shown in FIG. 12, the adjustable hinged anchor 42 may be further secured to the support rails 20, by stainless steel bolts 54, an associated washers 56, and a nylock nut (not shown).

In addition to the support rail 20 and its components, discussed above, a typical system 10 also includes three elongated bent aluminum chute panels 32, 34, and 36 (FIGS. 1, 2, and 7), each approximately 8'. These chutes are typically provided in ½" width increments, so they may be nested into one another for ease of assembly and site relocation.

The typical width of the bent aluminum chutes 32, 34, and 36 is in the range of 24" to 48". This gives a wide range of flexibility depending on the requirements of a given project, however other widths are well within the scope of the invention. The vertical sides of each chute panel 32, 34, 36 are of a height of approximately 8" to 9", though other heights are well within the scope of the invention. The spacing of the support rails 20 is determined by the width of the chute panels 32, 34, 36. The spacer bar 28 is sized to accommodate the appropriate chute width.

FIGS. 1, 2, 7, and 15 also show the chute transition stops 70 according to the invention. In certain embodiments, the chute transition stops 70 are adjustable.

As seen in FIGS. 2, 7, 8, 13, and 15, the chute panels are secured into place on the support rails during assembly by the adjustable chute transition stops 70. In the embodiment shown, the chute transition stops 70 are attached to the low side of the middle chute panel 34 and the top chute panel 36, allowing an overlap of the bottom chute panel 32 with the middle chute panel 34 and the middle chute panel 34 with the top chute panel 36. It is within the scope of the invention for the location of the chute transition stops 70 to be adjusted at 6" increments.

The chute transition stops 70 are typically an assembly of the following components: a stainless steel hex cap screw (typically ½"-13×3"), two stainless steel flat washers (½"), a PVC bushing sleeve, and a stainless steel nyloc-nut 98 (½"-13).

Figure 14:
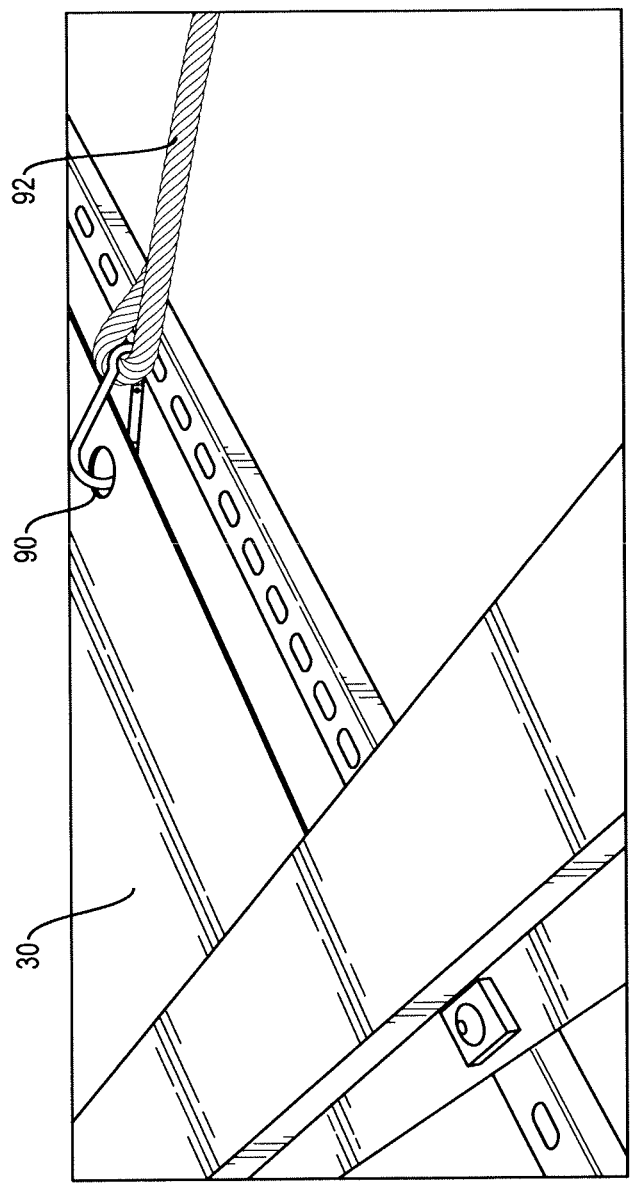
FIG. 14 is a close-up, top, rear perspective view, showing the orientation of the hole in a chute panel and the hoisting rope affixed therethrough.

As seen in FIG. 11, the chute panels 32, 34, 36 are provided with holes 90 near their top edges. These holes are provided for receiving a hoisting rope 92 (FIG. 14) for hoisting the chute panels 32, 34, 36 up to the desired locations along the length of the side rails 20 during assembly in the field.

A further feature of the invention is a bent roof eave debris stop 60 and an associated flat transition plate 80. A typical system 10 is provided twelve 8' bent aluminum L-angle roof eave debris stops 60, and one aluminum flat transfer plate 80, which services as a roof-to-chute-transition-plate. It is preferred that these elements be made of aluminum but they may be made of any convenient material effective for achieving the objectives of the invention, discussed herein.

Thus, the present support rail and chute system 10 is a complete self-contained system. The integrated dual rail supports 20 dispense with the need to obtain the support of a ladder, as well as any need for column/pipe supports of any kind.

The present versatile chute system can be employed for various purposes, such as the removal of roofing debris, transporting tools, and equipment off commercial roof areas. It may also be employed to remove snow from roof structures or transport snow down aisles at stadiums. It may also be employed to transport debris or materials from the interiors of residential and commercial structures through exterior windows, or wall openings.

While a specific embodiment of the invention has been shown and described in detail to illustrate the application of the principles of the invention, it will be understood that the invention may be embodied otherwise without departing from such principles.

What is claimed is:

1. A chute system, comprising:
   at least one support rail;
   at least one reinforcement element secured to said support rail;
   at least one spacer bar secured to said support rail at an end of said spacer bar;
   at least one hinged anchor secured to an end of said reinforcement element, said
   at least one hinged anchor further comprising a first flap and a second flap; and
   at least one chute panel resting at least partially on said support rail, wherein each of said first and second flaps define a raised opening at an end thereof, and said adjustable hinged anchor further comprising a D-ring secured thereto by being passed through said raised openings.

2. The chute system of claim 1, wherein said support rail is at least 16' long.

3. The chute system of claim 1, wherein said support rail is at least 24' long.

4. The chute system of claim 1, wherein said second chute panel is adapted to nest in said first chute panel.

5. The chute system of claim 4, further comprising a third chute panel.

6. The chute system of claim 5, wherein said third chute panel is adapted to nest in said second chute panel.

7. The chute system of claim 5, further comprising a chute engaging pole to set the position of said second chute panel and said third chute panel.

8. The chute system of claim 6, wherein said second chute panel and said third chute panel each comprise two chute transition stops.

9. The chute system of claim 1, wherein said chute panel defines an opening near an end thereof, the opening adapted to receive a hoisting rope.

10. A chute system, comprising:
at least one support rail;
at least one reinforcement element secured to said support rail;
at least one spacer bar secured to said support rail at an end of said spacer bar;
at least one hinged anchor secured to an end of said reinforcement element;
at least one chute panel resting at least partially on said support rail; and
a gusset plate secured to an end of said support rail, said gusset plate adapted to receive an additional support rail.

11. A chute system, comprising:
at least one support rail;
at least one reinforcement element secured to said support rail;
at least one spacer bar secured to said support rail at an end of said spacer bar;
at least one hinged anchor secured to an end of said reinforcement element;
at least one chute panel resting at least partially on said support rail; and
a roof eave debris stop secured to said chute panel.

12. The chute system of claim 11, wherein said roof eave debris stop is secured to said chute panel by mutual securement of said chute panel and said roof eave debris stop to a transition plate.

13. A chute system, comprising
a first support rail, said first support rail further comprising a first reinforcement element secured thereto;
a second support rail, said second support rail further comprising a second reinforcement element secured thereto;
a spacer bar having a first end and second, said spacer bar being secured to said first support rail at said first end and to said second support rail at said second end;
a first hinged anchor secured to an end of said a first reinforcement element;
a second hinged anchor secured to an end of said second reinforcement element; and
a plurality of chute panels resting on said first support rail and said second support rail,
wherein said chute panels are aligned end-to-end in an extended condition of said chute system, and
wherein said chute panels are at least partially overlapping in a contracted condition of said chute system.

14. A chute system, comprising
a first support rail, said first support rail further comprising a first reinforcement element secured thereto;
a second support rail, said second support rail further comprising a second reinforcement element secured thereto;
a spacer bar having a first end and second, said spacer bar being secured to said first support rail at said first end and to said second support rail at said second end;
a first hinged anchor secured to an end of said a first reinforcement element;
a second hinged anchor secured to an end of said second reinforcement element;
a first chute panel resting at least partially on said support rails;
a second chute panel resting at least partially on said support rails;
a third chute panel resting at least partially on said support rails,
wherein said second chute panel is adapted to nest in said first chute panel,
wherein said third chute panel is adapted to nest in said second chute panel, and
wherein said second chute panel and said third chute panel each comprise two chute transition stops.

* * * * *